United States Patent [19]

Jacobson

[11] 4,214,024

[45] Jul. 22, 1980

[54] COMPOSITE LABEL WEB AND METHOD OF MAKING SAME

[75] Inventor: David N. Jacobson, Dayton, Ohio

[73] Assignee: Monarch Marking Systems, Inc., Dayton, Ohio

[21] Appl. No.: 832,033

[22] Filed: Sep. 9, 1977

[51] Int. Cl.[2] .......................... B32B 3/10; G09F 3/00; A44C 3/00; B32B 31/00

[52] U.S. Cl. ....................................... 428/41; 40/2 R; 156/253; 156/291; 428/43; 428/137; 428/202; 428/211

[58] Field of Search .................... 428/40, 41, 201, 202, 428/211, 42, 43, 56, 137; 156/253, 268, 291; 40/2 R

[56] References Cited

U.S. PATENT DOCUMENTS

| | | | |
|---|---|---|---|
| 2,095,437 | 10/1937 | Fox | 40/2 R |
| 2,294,347 | 8/1942 | Bauer et al. | 428/211 |
| 2,636,297 | 4/1953 | Johnson | 40/2 R |
| 3,503,782 | 3/1970 | Ayres | 428/211 |
| 3,515,270 | 6/1970 | Tonn et al. | 428/343 |
| 3,706,626 | 12/1972 | Smith et al. | 428/42 |
| 3,885,334 | 5/1975 | Banks | 40/2 R |

*Primary Examiner*—William J. Van Balen

*Attorney, Agent, or Firm*—Joseph J. Grass

[57] ABSTRACT

There is disclosed a composite label web and method of making same. The composite label web is comprised of a web supporting material and label material releasably secured to the supporting material web by a patterned coating of pressure sensitive adhesive. There are feed holes through the composite web including one or more narrow zones of the adhesive which lie inboard of two relatively wide adhesive zones.

15 Claims, 5 Drawing Figures

COMPOSITE LABEL WEB AND METHOD OF MAKING SAME

BACKGROUND OF THE INVENTION

1. Field of the Invention

This invention relates to the art of composite label webs and to method of making same.

2. Brief Description of the Prior Art

U.S. Pat. No. 2,095,437 to Louis Fox dated Oct. 12, 1937 discloses a method of making composite label webs of the type having feed holes through each composite web between the side edges of the composite web. The marginal side edges of the label material are free of adhesive but the remainder of the label material is coated with the pressure sensitive adhesive. The wide composite web is slit into a pllurality of narrow composite label webs. The feed holes extend through the label material, the adhesive and supporting material web. In the type of composite web disclosed in U.S. Pat. No. 2,095,437, it is also known to omit the adhesive in a longitudinally extending central zone through which the feed holes extend so that the punch and die sets which make the feed holes do not come into contact with adhesive. Accordingly, the labels of each narrow composite web are held to the supporting material web by two spaced longitudinally extending zones of adhesive. Once the labels are removed from the supporting material web and applied to merchandise, the labels are only held to the merchandise by the two spaced adhesive zones. In that there is no adhesive in the longitudinally extending central zone the holding forces between the label and the merchandise are less than in the label according to U.S. Pat. No. 2,095,437. In the type of composite web disclosed in U.S. Pat. No. 2,095,437 it is also known to provide a thin zone of adhesive known in the art as a "wipe out" at the longitudinally extending central zone where the feed holes are made. By this arrangement the punch and die sets do not come into contact with as much adhesive as in U.S. Pat. No. 2,095,437, but the holding forces of the adhesive at the wipe out are extremely low.

SUMMARY OF THE INVENTION

The composite web of the invention is composed of a web of supporting material and pressure sensitive labels releasably secured by pressure sensitive adhesive to the supporting material web. The composite web is of the type which has feed holes extending through the label material and the supporting material web. The feed holes enable the web to be fed through a marking machine. The purpose of the invention is to provide a machine-feedable composite web having feed holes which has an efficient patterned coating of adhesive so that the labels adhere with superior holding force to the merchandise to which they are applied. The holding force is superior to that of a composite web with a wipe-out as described above, and yet the composite web of the invention is essentially as trouble-free to manufacture because the amount of adhesive encountered by the punch and die rolls is essentially the same as when the prior art composite web with a wipe-out is manufactured. In accordance with a specific embodiment of the invention, there is provided a web of supporting material, a web of label material having a patterned coating of pressure sensitive adhesive releasably securing the label material to the supporting material web, longitudinally spaced, lateral cuts dividing the label material into a series of labels, and the adhesive being disposed along two laterally spaced, relatively wide, longitudinally extending zones and there is at least one relatively narrow, longitudinally extending intervening zone. A longitudinally extending adhesive-free zone exists between each relatively wide adhesive zone and the adjacent relatively narrow adhesive zone and between adjacent relatively narrow adhesive zones. Longitudinally spaced feed holes are disposed at the lateral cuts and extend through the supporting material web and through the relatively narrow adhesive zones on the label material without extending into the relatively wide adhesive zones on the label material. The invention also includes method of making composite label webs as described above.

DETAILED DESCRIPTION OF THE PREFERRED EMBODIMENT

Figure 1:
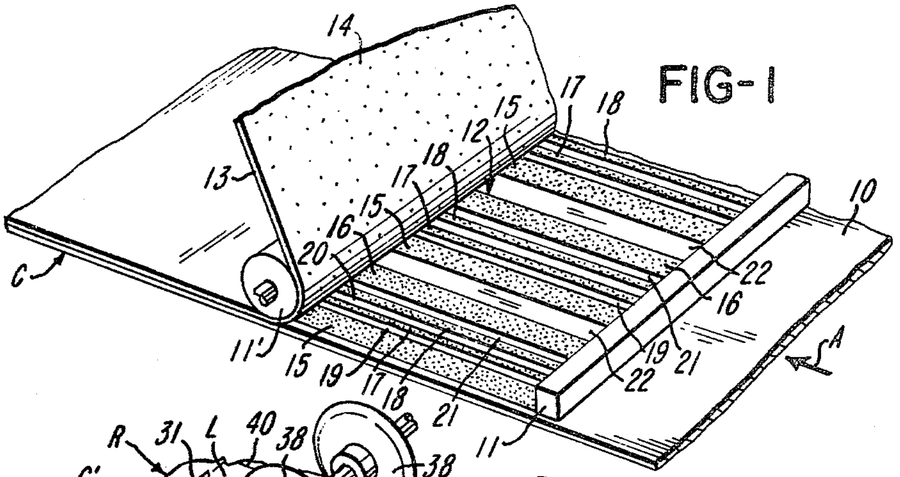
FIG. 1 is a diagrammatic perspective view showing how a wide composite web is made.

With reference to FIG. 1, there is shown a wide web of label material 10 which is indicated to be traveling in the direction of arrow A. The web 10 passes under a coating head 11 which coats the web 10 with a patterned coating generally indicated at 12 of pressure sensitive adhesive. A web 13 of supporting material has a release coating 14 to which the adhesive coating 12 adheres. Alternatively, the coating 12 can be applied to the release coating 14, in which event the coating 12 would adhere securely to the label material 10 when the coating 12 comes into contact with the label material 10. As the web 13 moves partially around the roll 11', the webs 10 and 13 form a wide composite web C. As shown in FIG. 1, the coating is distributed laterally across the label material web 10 in a repetitive series of zones or stripes of pressure sensitive adhesive. In particular, the coating 12 includes relatively wide, longitudinally extending laterally spaced adhesive zones 15 and 16. Disposed between each pair of zones 15 and 16 is a plurality of relatively narrow, longutudinally extending, laterally spaced zones, illustrated as two zones 17 and 18, of pressure sensitive adhesive. The zones 15, 17, 18 and 16 are spaced apart by longitudinally extending, relatively narrow adhesive-free zones 19, 20 and 21. Each set of zones 15 through 21 is spaced from an adjacent set of zones 15 through 21 by a longitudinally extending adhesive-free zone 22. It is preferred that the adhesive zones 15 and 16 be the same width, that the adhesive zones 17 and 18 be the same width and that the adhesive-free zones 22 be equal in width but narrower than either of the zones 15 or 16.

Figure 2:
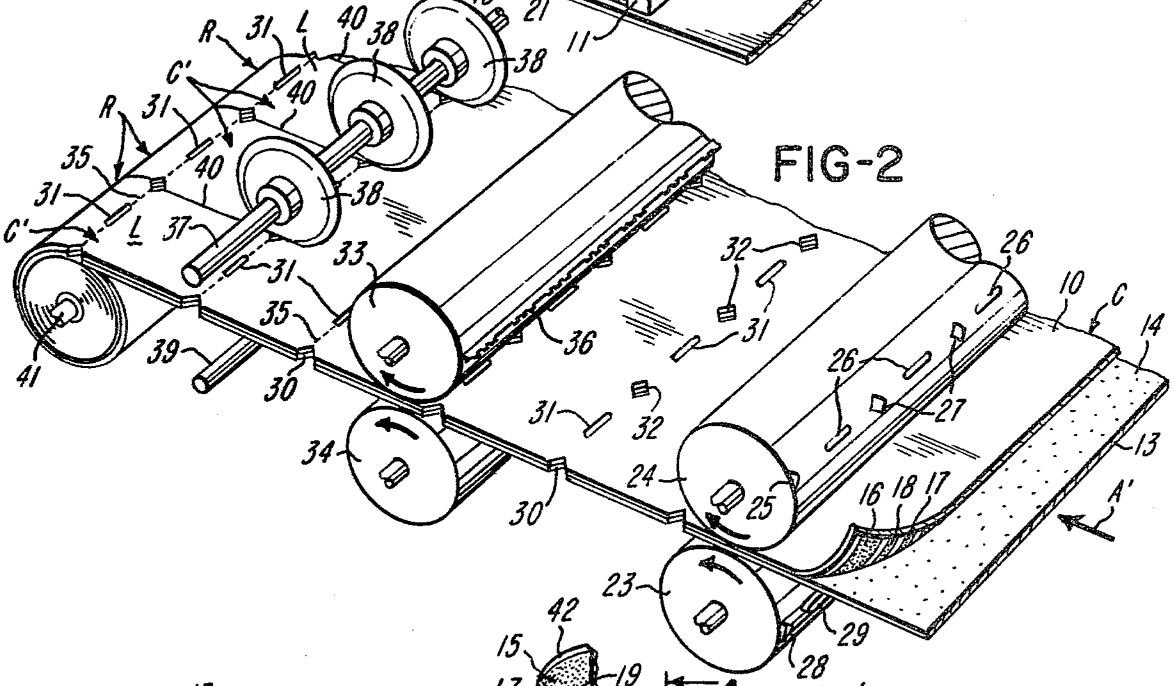
FIG. 2 is a diagrammatic perspective view showing how label rolls are made form a wide composite web.
Figure 3:
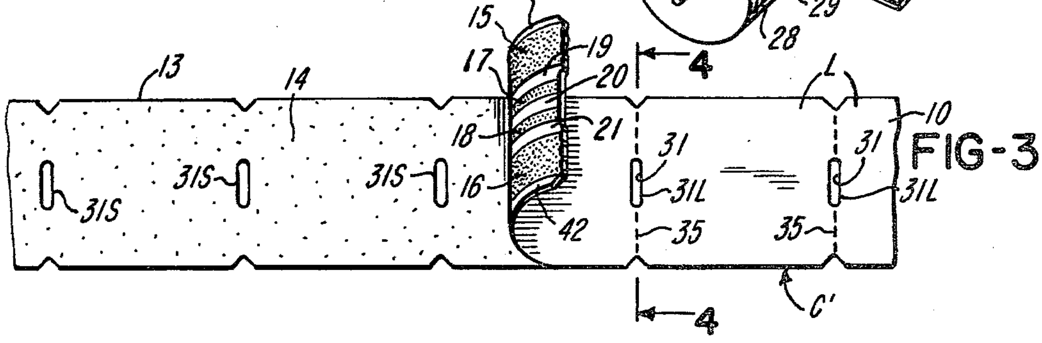
FIG. 3 is a top plan view showing a composite label web in accordance with the invention.
Figure 4:
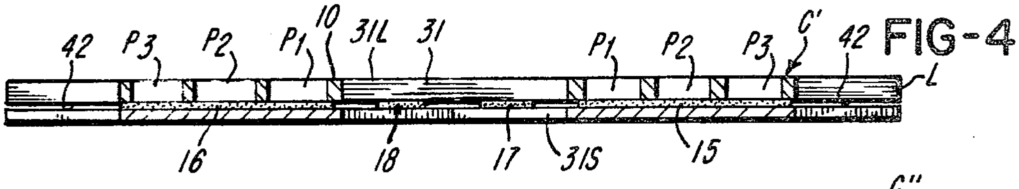
FIG. 4 is a sectional view taken along line 4—3 of FIG. 3.

With reference to FIG. 2, the wide composite web C is passed in the direction of arrow A' between punch and die rolls 23 and 24. The die roll 24 has die holes 25, 26 and 27 and the punch roll 23 has mating punches 28, 29 and so on. Thus, the rolls 23 and 24 cause the wide composite web C to have V-shaped notches 30, elongated feed holes 31, and diamond-shaped holes 32 punched through it. From there the web C passes between a perforating roll 33 and a back-up roll 34 which has at least one knife 36. The knife 36 makes transverse or lateral lines of perforations 35 through the label material 10 and, if desired, through the supporting material 13. Instead of perforating the label material along lines 35, the label material can be severed completely laterally along lines 35, without completely severing the supporting material web 13. From there the composite web C passes between a slitting roll 37 having a series of slitting knives 38 and a back-up roll 39. The rolls 37 and 39 slit the composite web C along longitudinally extending laterally spaced lines 40 to provide side-by-side relatively narrow composite webs C′, which are wound into rolls R on a mandrel 41. The slit lines 40 are preferably made midway between the sides of each adhesive-free zone 22, and accordingly, each composite label web C′ has a pair of adhesive-free zones 42 as shown in FIGS. 3 and 4, which are preferably of equal width. The lines 35 divide the label material 10 into labels L. As best shown in FIG. 4, the feed holes 31 extend entirely through the composite web C′. The portion of the feed hole 31 in the label material 10 is referenced as 31L and the portion of the feed hole 31 in the supporting material web 13 is referenced as 31S. As shown there are three perforations in the label material 10 along the line 35 at each side of the feed hole 31. Alternatively, different numbers and lengths of perforations, creases, scoring or other weakening along lines 35 can be used. The hole 31 passes through the zones 17 and 18 of adhesive, but the hole 31 is inboard of and spaced from the zones 15 and 16 of adhesive. As shown, the adhesive zones 15, 16, 17 and 18 all have the same thickness. Because the zones 17 and 18 are relatively narrow as compared with the length of the elongated hole 31 in the lateral direction, the punch and die rolls 23 and 24 can be formed satisfactorily without undue gumming of the manufacturing tools, and yet the holding force of the label L to the merchandise is substantially improved over a label having no adhesive in the central longitudinal zone through which has the feed holes as in U.S. Pat. No. 2,095,437 and is also substantially improved over a label having a wipe-out.

Figure 5:
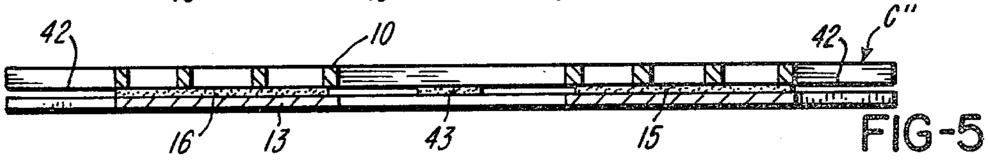
FIG. 5 is a sectional view similar to FIG. 4, but showing an alternative embodiment of the invention.

The embodiment of FIG. 5 discloses a composite label web C″ which is made and constructed identically to the embodiment of FIGS. 1 through 4 except that it has one relatively narrow longitudinally extending adhesive zone 43 between each pair of zones 15 and 16 rather than two or more zones 17 and 18 between each pair of zones 15 and 16. The zone 43 is preferably wider than either zone 17 or 18.

By way of example, not limitation, it is preferred that each adhesive zone 15 and 16 is at least about twice as wide as any adhesive zone 17 or 18, that each adhesive zone 15 and 16 is wider than adhesive-free zone 22, that adhesive-free zones 19, 20 and 21 are substantially narrower than zone 22, and it is most preferable that zones 17 and 18 be between about 0.35 and about 0.8 millimeter wide and that each relatively wide zone be between about 3.8 and about 5.0 millimeters wide, and that the coating be between about 0.13 and about 0.4 millimeter thick. In the embodiment of FIG. 5, the same example applies except that the relatively narrow zone is preferably between about 0.7 millimeter and about 1.6 millimeters wide.

Other embodiments and modifications of this invention will suggest themselves to those skilled in the art, and all such of these as come within the spirit of this invention are included within its scope as best defined by the appended claims.

I claim:

1. A composite web of pressure sensitive labels, comprising: a composite web including a web of supporting material and a web of label material having a patterned coating of pressure sensitive adhesive releasably securing the label material to the supporting material web, longitudinally spaced, lateral cuts dividing the label material into a series of labels, the adhesive being disposed along two laterally spaced, relatively wide, longitudinally extending zones and a relatively narrow, longitudinally extending intervening zone, a longitudinally extending adhesive-free zone between each relatively wide adhesive zone and the relatively narrow adhesive zone, the thicknesses of the relatively wide and narrow adhesive zones being substantially the same, and longitudinally spaced feed holes disposed at the lateral cuts and extending through the composite web and through the relatively narrow adhesive zone and the adhesive-free zones on the label material without extending into the relatively wide adhesive zones on the label material.

2. A composite web as defined in claim 1, wherein each relatively wide adhesive zone is at least about twice as wide as a relatively narrow adhesive zone.

3. A composite web as defined in claim 1, wherein the feed holes are elongated in the lateral direction, opposed ends of each feed hole being spaced from the respective relatively wide adhesive zones, the relatively wide adhesive zones being spaced from the respective side edges of the label material web.

4. A composite web of pressure sensitive labels, comprising: a composite web including a web of supporting material and a web of label material having a patterned coating of pressure sensitive adhesive releasably securing the label material to the supporting material web, longitudinally spaced, lateral cuts dividing the label material into a series of labels, the adhesive being disposed along two laterally spaced, relatively wide, longitudinally extending zones and a relatively narrow, longitudinally extending intervening zone, a longitudinally extending adhesive-free zone between each relatively wide adhesive zone and the relatively narrow adhesive zone, the thicknesses of the relatively wide and narrow adhesive zones being substantially the same, and longitudinally spaced feed holes disposed at the lateral cuts and extending through the composite web and through the relatively narrow adhesive zone and the adhesive-free zones on the label material without extending into the relatively wide adhesive zones on the label material, wherein the feed holes are spaced from the relatively wide adhesive zones.

5. A composite web as defined in claim 4, wherein the relatively narrow zone is between about 0.7 millimeter and about 1.6 millimeters wide.

6. A composite web as defined in claim 4, wherein the relatively narrow adhesive zone is between about 0.7 millimeter and about 1.6 millimeters wide, and the relatively wide adhesive zone is between about 3.5 and about 8 millimeters wide.

7. A composite web of pressure sensitive labels, comprising: a composite web including a web of supporting material and a web of label material having a patterned coating of pressure sensitive adhesive releasably securing the label material to the supporting material web, longitudinally spaced, lateral cuts dividing the label material into a series of labels, the adhesive being disposed along two laterally spaced, relatively wide, longitudinally extending zones and a plurality of relatively narrow, longitudinally extending intervening zones, a longitudinally extending adhesive-free zone between each relatively wide adhesive zone and the adjacent relatively narrow adhesive zone and between adjacent relatively narrow adhesive zones, the thicknesses of the relatively wide and narrow adhesive zones being substantially the same, and longitudinally spaced feed holes disposed at the lateral cuts and extending through the composite web and through the relatively narrow adhesive zones and the adhesive-free zones of the label material without extending into the relatively wide adhesive zones of the label material.

8. A composite web as defined in claim 7, wherein each relatively wide adhesive zone is at least about twice as wide as a relatively narrow adhesive zone.

9. A composite web as defined in claim 7, wherein the feed holes are elongated in the lateral direction, opposed ends of each feed hole being spaced from the respective relatively wide adhesive zones, the relatively wide adhesive zones being spaced from the respective side edges of the label material web.

10. A composite web of pressure sensitive labels, comprising: a composite web including a web of supporting material and a web of label material having a patterned coating of pressure sensitive adhesive releasably securing the label material to the supporting material web, longitudinally spaced, lateral cuts dividing the label material into a series of labels, the adhesive being disposed along two laterally spaced, relatively wide, longitudinally extending zones and a plurality of relatively narrow, longitudinally extending intervening zones, a longitudinally extending adhesive-free zone between each relatively wide adhesive zone and the adjacent relatively narrow adhesive zone and between adjacent relatively narrow adhesive zones, the thicknesses of the relatively wide and narrow adhesive zones being substantially the same, and longitudinally spaced feed holes disposed at the lateral cuts and extending through the supporting material and through the relatively narrow adhesive zones and the adhesive-free zones on the label material without extending into the relatively wide adhesive zones of the label material, wherein the feed holes are spaced from the relatively wide adhesive zones.

11. A composite web as defined in claim 10, wherein the relatively narrow zones are between about 0.35 millimeter and about 0.8 millimeter wide.

12. A composite web as defined in claim 10, wherein the relatively narrow adhesive zones are between about 0.35 millimeter and about 0.8 millimeter wide, and the relatively wide adhesive zone is between about 3.5 and about 8 millimeters wide.

13. A composite web as defined in claim 10, wherein there are two and only two relatively narrow adhesive zones.

14. A composite web as defined in claim 11, wherein there are two and only two relatively narrow adhesive zones.

15. A composite web as defined in claim 12, wherein there are two and only two relatively narrow adhesive zones.

* * * * *